E. REICH.
SEAL.
APPLICATION FILED SEPT. 17, 1917.
1,361,903.
Patented Dec. 14, 1920.
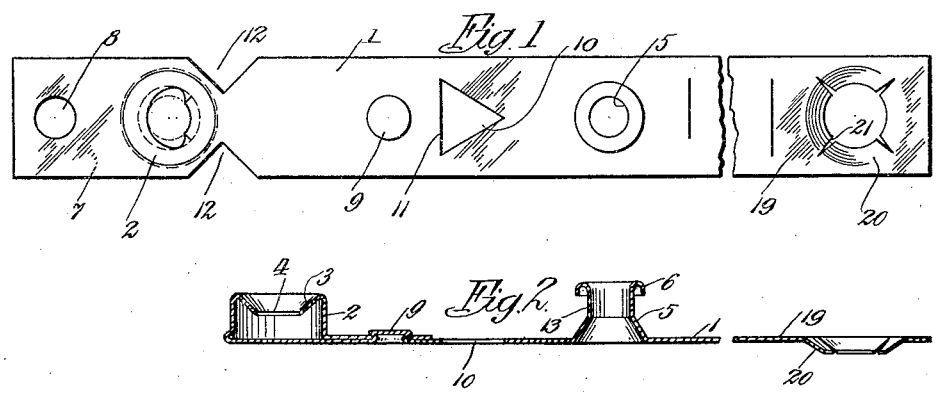
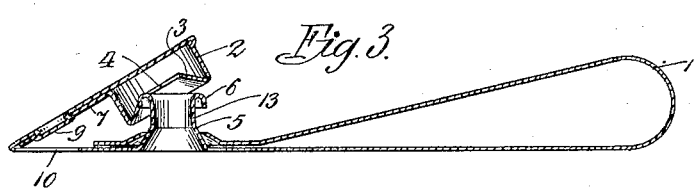
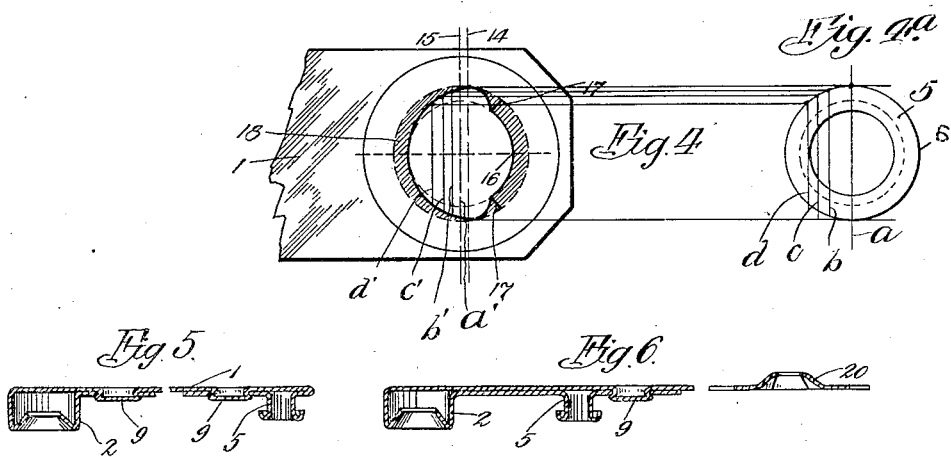
WITNESSES:
Marie Hummel
Berthold Oblatt
INVENTOR.
Ernest Reich
BY Henry Hech
ATTORNEY.

UNITED STATES PATENT OFFICE.

ERNEST REICH, OF CHICAGO, ILLINOIS, ASSIGNOR TO THE HILL PUMP VALVE COMPANY, OF CHICAGO, ILLINOIS.

SEAL.

1,361,903.      Specification of Letters Patent.      Patented Dec. 14, 1920.

Application filed September 17, 1917. Serial No. 191,810.

*To all whom it may concern:*

Be it known that I, ERNEST REICH, a citizen of the United States, residing at Chicago, county of Cook, and State of Illinois, have invented a new and useful Improvement in Seals, of which the following is a specification.

The invention relates to seals of the type described in my prior patent applications serially numbered 78686 and 109300 respectively.

The invention more particularly relates to a further improvement of the button type seals and to a novel method of manufacturing the same.

As emphasized in my prior applications referred to above, it is of prime importance that the seals should form a guarantee against tampering, that any such attempt should be readily recognizable, that the parts should be open to inspection and yet inaccessible to instruments used for fraudulent purposes, and that in view of the fact that each seal is used but once, the seals should be extremely cheap to produce. To meet the mentioned requirements and thereby to lessen the danger of looting of railroad cars without ready detection forms the principal object of the invention.

The seal forming the subject matter of this invention is especially adapted to solve the problem underlying the art of seals, for the reason that it forms an integral structure produced by a series of forming steps from a sheet metal strip, and thereby involves no connections of parts, no joints or fastenings liable to attract the attention of persons who surreptitiously try to open and subsequently close the seal, with a view of avoiding ready detection of such acts. It is, therefore, a significant feature of the invention that all the interengaging parts of the seal are formed integral with the strip, and the method of forming the integral locking members constitutes the invention.

It is an object of the invention to provide a seal such that the socket member thereof which with the plug member is brought into interlocking engagement is arranged prior to such interlocking in a predetermined angular position, so that the longitudinal diameter of the socket opening can be less than the diameter of the flange at the upper end of the plug member, while the diameters in transverse direction only need to be larger to an extent sufficient to provide the necessary clearance to permit the entry of the plug member into the socket member.

A further object aims at the provision of a locking member with an elongated hole of a form to insure engagement with the associated locking member at one point only during the locking operation.

It is also an object to form tubular locking members for seals by stamping from the strip a concavo-convex head of a height and base respectively equal to and wider than the height and base of the finished member, so that the finished member obtained by gradual shaping of the head has not been placed under tensile strain, but possesses greater molecular density than any untreated portion of the seal.

It also constitutes an object of the invention of providing in the simultaneous formation of a plurality of locking members an increased amount of material at convenient places prior to their formation.

A further object constitutes the provision of a bead intermediate the members to be formed, which affords an increased amount of material necessary for forming the members with great molecular density, and also provides the necessary resiliency in the course of formation.

To the accomplishment of the general objects stated, and others that will be apparent upon perusal of the specification and claims forming a part thereof, the invention is illustrated by way of example in the accompanying drawings, in which—

Figure 1 is a top plan view of a seal in open position made in accordance with the invention.

Fig. 2 is a longitudinal section through the seal with the end portion of the strip folded upon itself so as to afford a wall covering the base opening of one of the locking members.

Fig. 3 is a similar section as Fig. 2 with the strip bent intermediate the locking members to bring the latter in position to be locked.

Fig. 4 is a fragmentary top plan view upon the socket member to an enlarged scale.

Fig. 4ª is a top plan view of the plug member.

Fig. 5 is a section through a modified seal with the locking members arranged on the same side of the strip and with the end portions thereof folded upon themselves to afford a wall covering the base openings of both locking members.

Fig. 6 is a longitudinal section of a further modified seal, where the locking members are arranged at one end thereof.

Referring to the drawings, and particularly to Figs. 1 to 4, 1 designates a strip or shackle of sheet metal or other suitable material, which adapts itself readily to the requirements of a seal. At one end of the strip a locking member 2 of tubular construction is formed integral with the strip. The upper end of the locking member 2 is bent back upon itself to form a flaring portion 3, which at its base forms an oddly shaped aperture 4, for a purpose presently to be described. At a suitable distance from the locking member 2, another locking member 5 is formed integral with the strip 1. This member extends in a direction opposite to that of the coöperating locking member 2, as may be readily recognized from Fig. 1 and from Fig. 2, where the member 2 is shown on the under side and the member 5 on the upper side of the strip 1. The locking members 2, 5, which may be also termed plug and socket members, extend in vertical direction with respect to their integral strip or shackle. The member 5 is formed with a downturned flange 6 adapted to interengage with the flaring portion 3 of the coöperating member 2.

In closing the seal, the end portion 7 of the strip is folded upon itself, so that by virtue of the downwardly extending member 2 the base opening thereof is covered by the body portion of the strip. To secure the end portion in folded position, it is provided with a circular opening 8 adjacent to its free edge, and a concavo-convex portion 9 is struck out from the strip which extends through the aforementioned aperture 8, after the end portion has been folded upon itself. Thereupon the head 9 is flattened, thereby riveting together the end and body portions of the strip 1.

The provision of the locking members in vertical position with respect to the connecting strip simplifies the construction thereof, but this advantage would be obtained at the expense of an easy locking. To insure the latter, a triangular cut-out 10 is provided between the locking members 2, 5, the base 11 of which determines the line along which the strip 1 is bent in order to bring the plug and socket members in registering position prior to being locked. As indicated in Fig. 1, triangular cut-outs 12 are arranged in proximity to member 2, first for the purpose of enabling accurate bending of the end portion 7 of the strip to bring the member 2 into the position shown in Fig. 2, and second to remove material from what will be the outer side of the member 2, when it is brought in upstanding position as viewed in Fig. 2, so as to offer no hold for pliers or similar instruments when attempts are made to surreptitiously open the seal.

When the strip has been folded on the line 11 of the triangular cut-out 10, the locking members 2, 5 occupy the angular position with respect to each other, as shown in Fig. 3, notwithstanding the fact that they are vertical with respect to the strip. From this it is evident that the slanting position of the members 2, 5, necessary to avoid circumferential engagement of the flanges 3 and 6 in the locking operation, is obtained without arranging any of the members oblique to the strip, which entails special forming operations and thus increases the cost of manufacture. In my prior applications, the opening 4 is of elliptical or elongated form with the short diameter corresponding to the outside diameter of the flange 6, so that engagement of the parts during locking takes place at only two diametrically opposite points. In the present case, provision is made that engagement of the parts during locking takes place at only one point, and in spite of this the members interengage when locked with sufficient area, not only to avoid accidental opening of the members, but to render forceful attempts of opening utterly futile.

To this end the locking member 2 is equipped with an oddly formed, elongated opening 4 (Fig. 4), the smallest diameter of which is in longitudinal direction and equals the diameter of the neck portion 13 of member 5. The largest diameter of the opening is on the transverse line 14 at a slight distance from the line 15, forming the center line of the locking member 2. The larger diameter obviates any contact of the flange 3 with the flange 6 on this line, as it slightly exceeds the diameter of the flange 6, and it is situated by reason of its distance from the center line in that position, where by virtue of the relative angular position of the locking members engagement would take place.

The distance between the transverse lines 14, 15 can be determined by drawing an arc in Fig. 2 about the bending line of the strip portion 7 as a center and having as radius the distance of the central opening 4 from said bending line.

When the parts shown in Fig. 3 are being completely locked, engagement only takes place when a point 16 (Fig. 4) on the intersection of the periphery of opening 4 and the central longitudinal axis of the strip move over the flange 6 of member 5. To prevent that, portions of the opening periphery adjacent to point 16 contact with the flange 6, these portions are brought out of the plane of the point 16 by a forming operation, whereby the shoulders 17 are produced.

From the foregoing it is obvious that by reason of the oblique position of the opening of the socket member 2 prior to being locked, the small diameter of the opening 4 extending in longitudinal direction, although it only equals the diameter of the neck portion 13, easily passes over the flange 6, which, of course, has a larger diameter as the arcuate movement of the socket member about the line defined by the apexes of the triangular cut-outs 12, and the oblique position of the plane defined by the edge at the narrow end of flaring portion 3, when the socket member 2 occupies the position shown in Fig. 3, provides the necessary clearance so as to permit the opening in longitudinal direction to pass the flange 6 of the socket member. Because of the angular position of the locking members 2, 5, although the longitudinal diameter of opening 4 equals the diameter of the neck portion 13, the flaring portion 3 may be gradually forced over the flange 6, the engagement occurring at the lateral portions of the opening. If the opening 4 were circular, then the locking could not take place for the edge of the opening in transverse direction would engage the flange 6 and prevent locking. It is therefore necessary to elongate the opening in transverse direction so that the proper clearance for the co-acting portions of the flange 6 should be obtained. The manner of obtaining the eccentric portion of opening 4 is illustrated in Figs. 4, and 4ª. In Fig. 4ª a top plan view of the plug member 5 is shown. There a series of transverse lines $a$, $b$, $c$, $d$, are shown which intersect the circumference of flange 6. These points of intersection are projected to transverse lines $a'$, $b'$, $c'$, $d'$, in Fig. 4, which have the same respective distances from the line 14, as the lines $b$, $c$, $d$, have from the transverse central line $a$ in Fig. 4ª. That portion of the eccentric curve, shown in Fig. 4, and extending between the shoulder 17 and the transverse line 14 is arbitrary and is designed with a view of avoiding unnecessary removal of material.

The opposite end portion 19 of the strip is formed with a member 20, preferably in the form of a truncated cone, with the larger diameter at the base. To enhance its resiliency, the member 20 is provided with a plurality of slots 21. Prior to locking the members 2, 5, the strip end 19 is folded to bring the member 20 in circumferential engagement with the locking member 5. The purpose of the member 20 is explained in my copending application, serially numbered 78686, but it may be stated briefly that it serves as an additional locking means to prevent relative movement of the locking members 2, 5 upon manipulation.

Figs. 5 and 6 illustrate forms of a seal where both locking members are arranged at one side of the strip and where both base openings of the locking members are covered by the strip. In other respects, these modifications are evolved upon the same principle which underlies the seal illustrated in Figs. 1 to 4. As will be seen by reference to Fig. 5, the additional locking member is dispensed with, and two coöperating locking members are arranged at the ends of the strip extending therefrom in the same direction. Both ends are folded upon the body portion of the strip, so that the base openings of the locking members are covered when brought into locking position. In Fig. 6, the locking members are arranged at the same end of the strip and on the same side thereof. As indicated, the strip end is folded so as to cause both members to participate in the folding movement, thus obtaining the covering of the base openings of both of said members.

There are a good many changes which suggest themselves to those versed in this particular art, and I therefore claim my invention as broadly as the state of the art will permit.

I claim:—

1. A seal including a strip, a socket member vertically extending from said strip and having an inwardly directed flaring portion, a plug member extending vertically from said strip and having a circumferential flange adapted to interengage with said flaring portion, said flaring portion being formed at its narrow end with an elongated opening the smallest diameter of which in longitudinal direction corresponds to the diameter of the neck portion of the plug member, the transverse dimensions of the opening being sufficient to prevent engagement of the edge portion thereof with said flange.

2. A seal including a strip of material, a socket member vertically extending from said strip and having an inwardly directed flaring portion, a plug member extending vertically from said strip and having a circumferential flange adapted to be forced through said flaring portion to encompass the free edge thereof, the flaring portion having an opening in its free end and having the lateral edge portions of said opening cut away to prevent engagement with said flange and the outer edge portion between said lateral portions formed to provide engagement with said flange at one point only during the locking operation.

3. A seal including a strip of material, a socket member vertically extending from said strip and having an inwardly directed flaring portion, a plug member extending vertically from said strip and having a circumferential flange adapted to be forced through said flaring portion to interengage with the free edge thereof, said strip being bent intermediate said members to bring the axes of said members into position to form a predetermined obtuse angle prior to being locked, the flaring portion having an elongated opening in its free end and having its edge portion adjacent said opening formed to provide engagement with said flange at one point only during the locking operation.

4. A seal comprising tubular locking members adapted to interlock upon being brought into engagement, a flexible element interconnecting said tubular members, the end portion of said element being folded upon itself to afford a closure for the base opening in said locking members.

5. A seal comprising tubular locking members adapted to interlock upon being brought into engagement, a flexible element interconnecting said tubular members, the end portion of said element being folded upon itself to afford a wall covering the base opening in said locking members, and means for securing the end portion to the body portion of said element.

6. A seal comprising tubular locking members adapted to interlock upon being brought into engagement, a flexible element interconnecting said tubular members, the end portion of said element being folded upon itself to afford a wall covering the base opening in said locking members, and means integral with said flexible element for securing the end portion to the body portion of said element.

7. A seal comprising tubular locking members adapted to interlock upon being brought into engagement, a flexible element interconnecting said tubular members, the end portion of said element being folded upon itself to afford a wall covering the base opening in said locking members, and a rivet stamped out from said element to secure the end portion to the body portion of said element.

8. A seal comprising tubular locking members adapted to interlock upon being brought into engagement, a flexible element interconnecting said tubular members, and means integral with said element for closing the base opening in said members.

9. A seal comprising tubular locking members adapted to interlock upon being brought into engagement, a flexible element interconnecting said tubular members, a portion of said element being folded upon itself to afford a closure for the base opening of said locking members.

10. A seal comprising a flexible element, tubular locking members extending vertically from said element and adapted to interlock upon being brought into engagement, the end portion of the element being folded upon itself to afford a closure for the base opening of said members, said element being bent intermediate said members to bring the axes of said parts into position to form an obtuse angle prior to being locked.

11. A seal including a strip, a socket member vertically extending therefrom and having an inwardly directed flaring portion, a plug member extending vertically from said strip and having a circumferential flange adapted to interengage with said flaring portion, and means for closing the base opening of said members, said strip being bent intermediate said member to bring the plane defined by the free edge of said flaring portion in acute angular relation to the plane defined by the flange of the plug member.

In testimony whereof I have herewith set my hand.

ERNEST REICH.